INVENTOR.
DOYLE C. WELLS
BY Knox & Knox

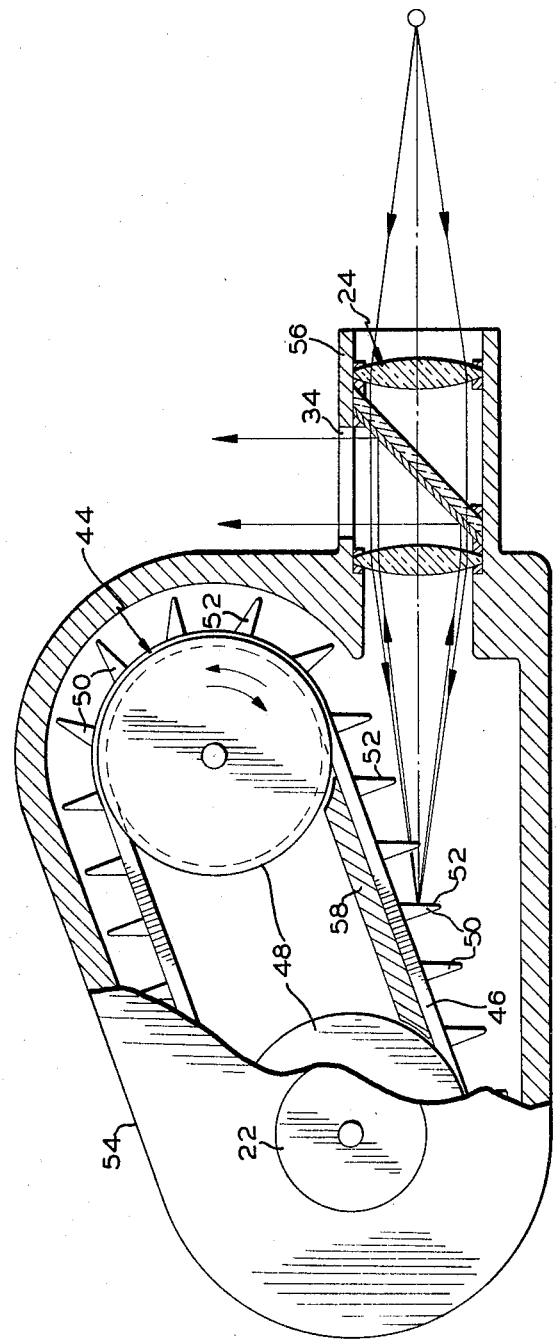

3,288,017
WAVELENGTH CHANGER FOR THE INFRARED AND OPTICAL BAND
Doyle C. Wells, San Diego, Calif., assignor to The Ryan Aeronautical Co., San Diego, Calif.
Filed June 11, 1962, Ser. No. 202,045
2 Claims. (Cl. 88—1)

The present invention relates generally to optical instruments and more particularly to a wavelength changer for optical and near optical frequencies.

The primary object of this invention is to provide a wavelength changer which will receive wave energy over a wide range of optical and near optical frequencies and provide a reflected output with an accurate and constantly controlled change in wavelengths, above or below the frequency of that received.

Another object of this invention is to provide a wavelength changer which is a very simple mechanical assembly and contains a single moving unit.

Another object of this invention is to provide a wavelength changer having a flicker-free output precisely matching the characteristics of the input, and which can be adjusted while in operation to any desired wavelength change.

A further object of this invention is to provide a wavelength changer which is extremely compact, light in weight and adaptable to a variety of uses.

Finally, it is an object to provide a wavelength changer of the aforementioned character which is simple and convenient to manufacture and operate and which will require an absolute minimum of service and attention.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 4 is a cut-away view of an alternative reflector arrangement.

Figure 1:
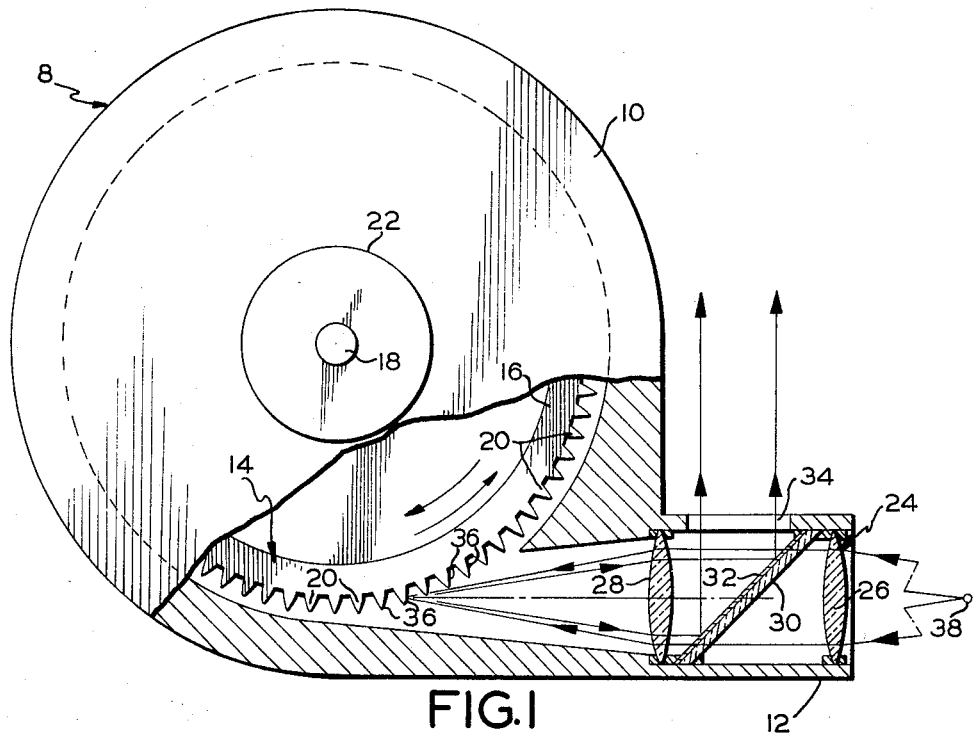
FIGURE 1 is a side elevation view of the complete unit, partially cut away to show the optical and mechanical details thereof.

Referring now to FIGURE 1 of the drawings, the wavelength changer 8 is completely enclosed in a simple casing 10, illustrated as basically cylindrical, and having a short, open ended barrel 12 extending tangentially therefrom. Within the casing 10 is a reflector unit 14 comprising a disc 16 mounted on an axial shaft 18 and having thereon a plurality of radially extending, peripherally spaced reflectors 20 in an endless train. The reflector unit is driven in rotation by a suitable motor 22, which may be mounted directly on casing 10 or coupled to shaft 18 in any convenient manner. The motor 22 must be reversible and preferably be capable of accurate speed control, various available electric motors being suitable.

In the barrel 12 is a collimating system 24 including a pair of coaxial focusing lenses 26 and 28, between which is a partially silvered plane mirror 30, substantially at 45 degrees to the collimating axis, the silvering or reflective coating 32 being a first surface on the side toward the reflector unit 14. At the side of barrel 12 is an exit aperture 34 through which the reflection from mirror 30 is directed.

Figure 2:
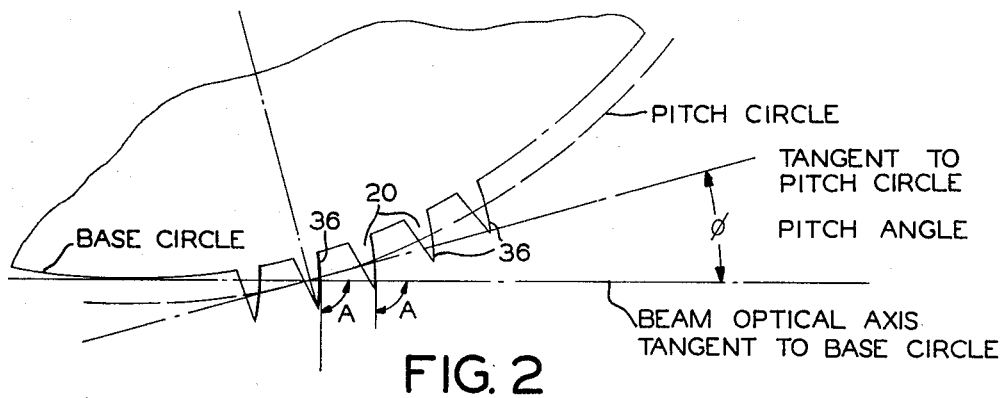
FIGURE 2 is an enlarged diagrammatic view of the reflector geometry.

The change of wavelength produced by the unit is a function of relative motion of the reflectors 20 along the optical axis of the incoming collimated wave energy, as hereinafter described in more detail, and is obtained by rotation of disc 16. In order to maintain the correct optical alignment the reflective surfaces of reflectors 20 must stay at a constant angle A, specifically perpendicular, to the optical axis of the collimating system 24 as the reflector unit 14 rotates, as indicated in FIGURE 2. Since the reflectors 20 resemble gear teeth, the reflective surfaces 36 facing the collimating system may be of involute form following an involute developed from a base circle of suitable diameter according to the well known gear formula:

$$D_b = \cos \phi D_p$$

where $D_b$ is the base circle diameter, $D_p$ is the pitch diameter and $\phi$ is the pitch angle between the optical axis and a tangent to the pitch diameter circle at its intersection with the optical axis. With the optical axis tangent to the base circle, the immediate portion of each reflective surface 36 at its intersection with the optical axis will remain perpendicular to the optical axis, even though the reflectors 20 are moving across the collimated beam.

It should also be noted from FIGURES 1 and 2 that the reflectors 20 are closely spaced so that the incident wave energy is always being reflected with no interruption, thus eliminating flicker. In fact the collimated beam will almost always be striking two or more of the reflectors simultaneously.

The change in wavelength is a phenomenon of Doppler shift caused by motion of the reflectors 20 effectively along and parallel to the optical axis of the incident wave energy. Depending on the direction of rotation of reflector unit 14, the velocity of reflectors 20 is either added to or subtracted from the velocity of the incident energy from some suitable source 38, indicated in FIGURE 1. In order to change the wavelength of a train of wave energy, energy must be added to the train to reduce wavelength and removed from the train to increase wavelength, as expressed by Planck's equation:

$$E = h/\lambda$$

where E is the energy, $h$ is Planck's constant and $\lambda$ is the wavelength. The change in wavelength is thus:

$$D\lambda = \lambda 0 (\pm 2v/C)$$

where $D\lambda$ is the Doppler shift, $\lambda 0$ is the initial wavelength, $v$ is the velocity of the reflecting surface and C is the velocity of light.

Incident wave energy from source 38 is thus focused by the collimating system 24 and passes through mirror 30 to strike the reflective surfaces 36, which are moving relative to the incident energy. The reflected energy is returned along the optical axis and further reflected through the exit aperture 34 by reflective coating 32, the directional ray paths being indicated in FIGURE 1. The direction of the reflected energy to one side avoids obstruction of the incident energy and makes the unit more convenient to use with associated equipment.

The change in frequency or wavelength is thus a function of the peripheral speed of reflector unit 14 at the radius of intersection with the optical axis, this speed being easily determined from the rotational speed of shaft 18. Since the critical factor is the relative velocity of the reflectors 20, the overlap of the incident energy from one reflective surface 36 to the next is inconsequential. The output is a faithful reproduction, shifted in wavelength, of the incident energy, whether steady state, pulsed, or varying in some other characteristic.

The apparatus is effective for all optical wavelengths, infrared and ultraviolet, with suitable optics. As a particular example, with incident energy of a wavelength on the order of four microns, a peripheral speed or relative reflector velocity of 0.2 feet per second will cause a frequency change of 30 kilocycles per second.

An alternative structure is illustrated in FIGURE 4, in which the reflectors are flat rather than involute in form. In this structure the disc element is replaced by a reflector unit 44 comprising an endless flexible belt 46 carried on spaced rollers 48, one of which is driven by a motor 22. Fixed to the belt 46 are spaced reflectors 50 having flat reflective surfaces 52. The unit is enclosed in a suitably shaped casing 54 having a barrel 56 in which is a collimating system 24, as previously described. The rollers 48 are offset so that one flat or linear portion of belt 46 between the rollers is inclined across the optical axis of collimating system 24, the reflective surfaces 52 being perpendicular to the optical axis. For stability, the flexible belt 46 may be supported by a flat platform 58.

The principle of operation is the same as that described above, the belt 46 being driven to move the reflectors 50 at the required velocity. Each structure has its advantages for particular applications, the disc type reflector unit being more rigid and suitable to uses where vibration or other motion may occur, while the flexible belt arrangement may be suitable for bench instrumentation, the flat reflectors costing less to fabricate than the involute type.

Figure 3:
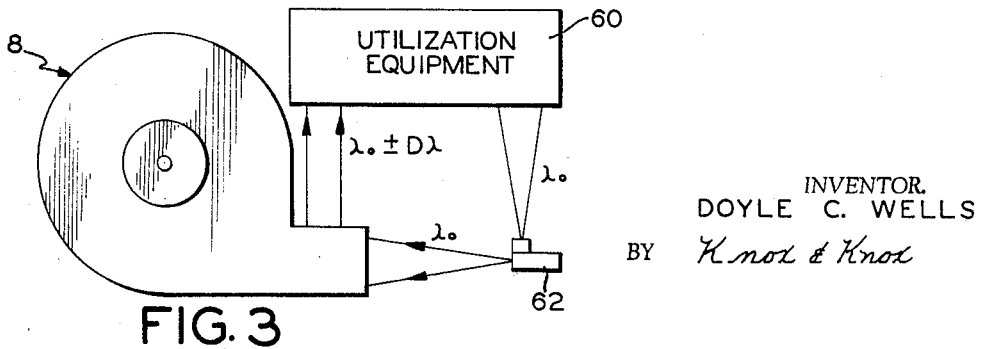
FIGURE 3 is a diagrammatic view of one use of the unit.

The unit can be used for many different purposes in test instrumentation, as a source of variable and closely controllable wave energy, or as an artificial target which will simulate motion by Doppler shift. An example of the latter is illustrated diagrammatically in FIGURE 3 in which the wavelength changer is used in conjunction with utilization equipment 60, which may be a test assembly of target detecting and motion indicating means, such as used in certain types of homing missiles which sense infrared radiation. An infrared source 62 directs wave energy to the utilization equipment 60 and to wavelength changer 8, at an incident or initial wavelength $\lambda_0$. The wavelength changer also provides an output to the utilization equipment of wavelength $\lambda_0 \pm D\lambda$, simulating a moving target by Doppler shift. This arrangement provides reference radiation as from a stationary target and also, for comparison Doppler shifted radiation similar to a moving target, which can be varied over a wide range by merely changing the speed of motor 22. Other uses will be apparent to those skilled in the art.

It is understood that minor variation from the form of the invention disclosed herein may be made without departure from the spirit and scope of the invention, and that the specification and drawing are to be considered as merely illustrative rather than limiting.

I claim:
1. A wavelength changer, comprising:
 a disc-like rotatable reflector unit having a peripheral train of substantially radially extending, closely spaced reflectors, each reflector having a reflective surface of involute form;
 a collimating system to focus incident wave energy and having an axis intersecting the periphery of said reflector unit at such an angle that the involute surfaces of said reflectors maintain a constant angle relative to said axis as the reflectors pass across the axis;
 means to rotate said reflector unit causing said reflectors to move across and effectively along said axis, whereby wave energy from said collimating means reflected from said reflectors is subjected to a Doppler shift;
 and a fixed mirror disposed to intercept and redirect the reflected wave energy.

2. A wavelength changer, comprising:
 a disc-like rotatable reflector unit having a peripheral train of substantially radially extending, closely spaced reflectors, each reflector having a reflective surface of involute form;
 a collimating system to focus incident wave energy and having an axis intersecting the periphery of said reflector unit at such an angle that the involve surfaces of said reflectors are constantly perpendicular to said axis as the reflectors pass across the axis and reflect wave energy back along the axis;
 means to rotate said reflector unit causing said reflectors to move across and effectively along said axis, whereby wave energy reflected from said reflectors is subjected to a Doppler shift;
 and a partially transparent mirror angularly disposed in said collimating system to intercept and redirect the reflected wave energy.

References Cited by the Examiner

UNITED STATES PATENTS

| 2,272,604 | 2/1942 | Everitt | 88—1 |
| 2,683,855 | 7/1954 | Blitz | 343—17.7 |
| 2,914,765 | 11/1959 | Hutchins | 343—17.7 |

FOREIGN PATENTS 457,911  7/1913  France.

OTHER REFERENCES

Jenkins, F., et al.: Fundamentals of Optics, McGraw-Hill (1950), Sec. 11.6, pp. 190–195 (particularly note last paragraph of Sec. 11.6, p. 195).

JEWELL H. PEDERSEN, *Primary Examiner.*

W. L. SIKES, *Assistant Examiner.*

UNITED STATES PATENT OFFICE
CERTIFICATE OF CORRECTION

Patent No. 3,288,017                                                  November 29, 1966

Doyle C. Wells

It is hereby certified that error appears in the above numbered patent requiring correction and that the said Letters Patent should read as corrected below.

Column 4, line 22, for "involve" read -- involute --.

Signed and sealed this 12th day of September 1967.

(SEAL)
Attest:

ERNEST W. SWIDER                                           EDWARD J. BRENNER
Attesting Officer                                               Commissioner of Patents